1,998,670

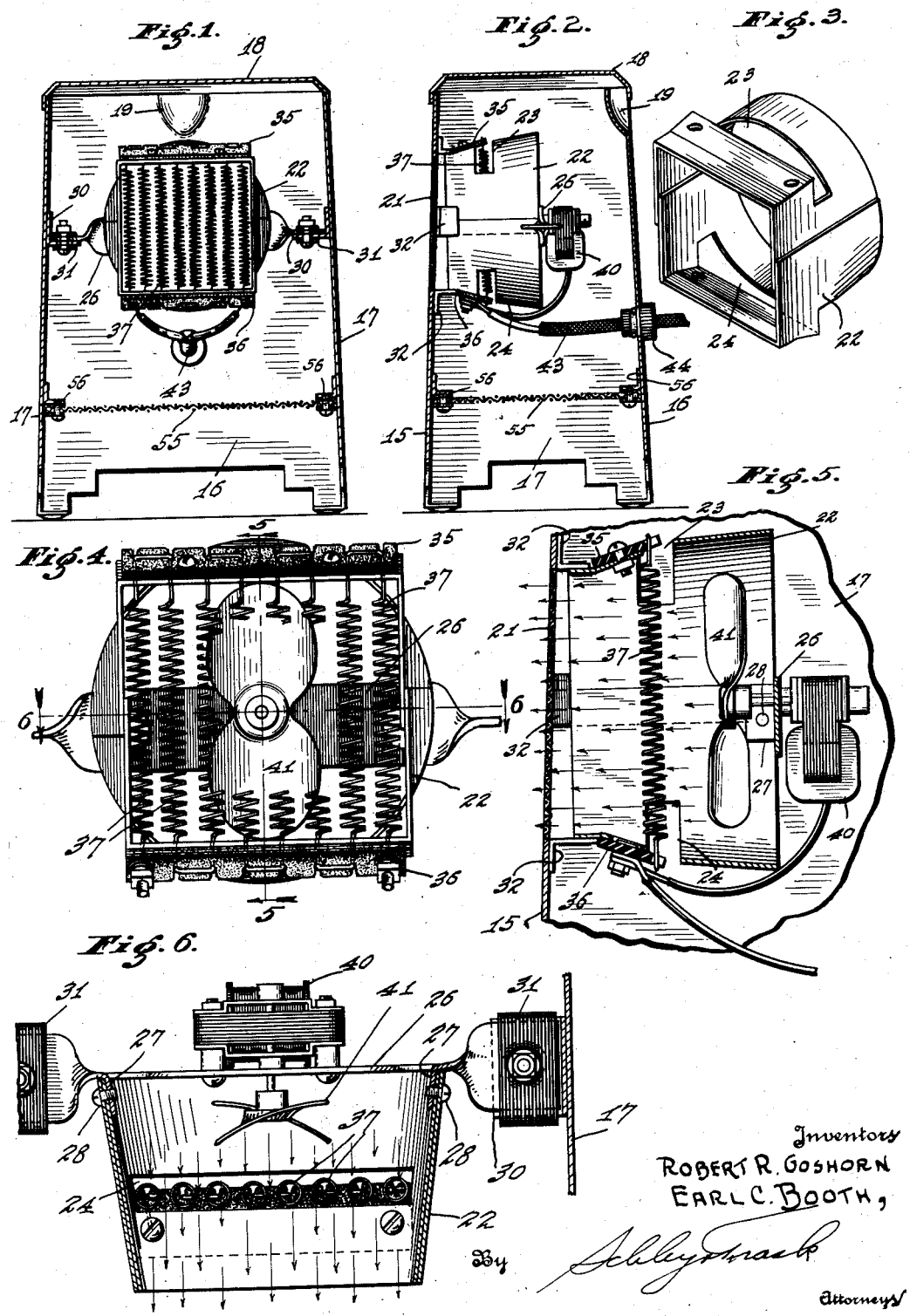
April 23, 1935.  R. R. GOSHORN ET AL  1,998,670
ELECTRIC HEATER
Filed Dec. 4, 1930   2 Sheets-Sheet 1
Inventors
ROBERT R. GOSHORN
EARL C. BOOTH,
By
Attorneys April 23, 1935.   R. R. GOSHORN ET AL   1,998,670
ELECTRIC HEATER
Filed Dec. 4, 1930   2 Sheets-Sheet 2
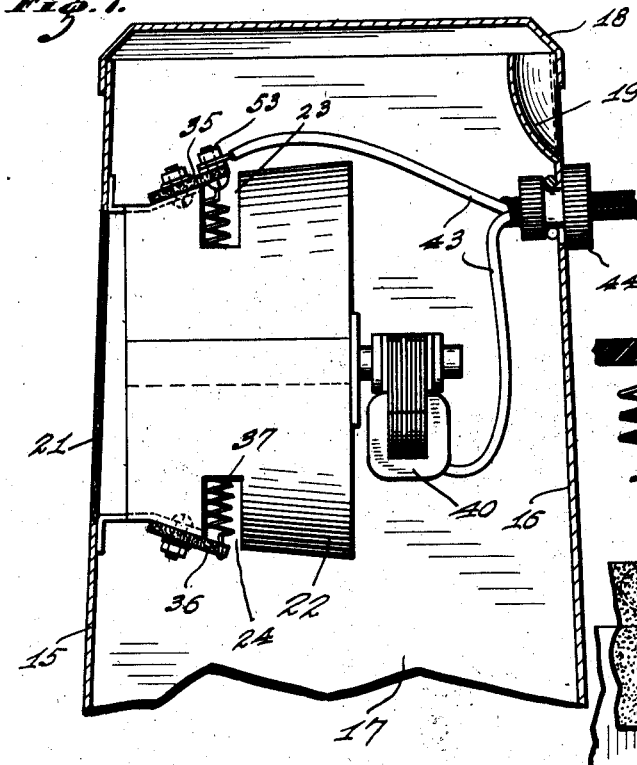
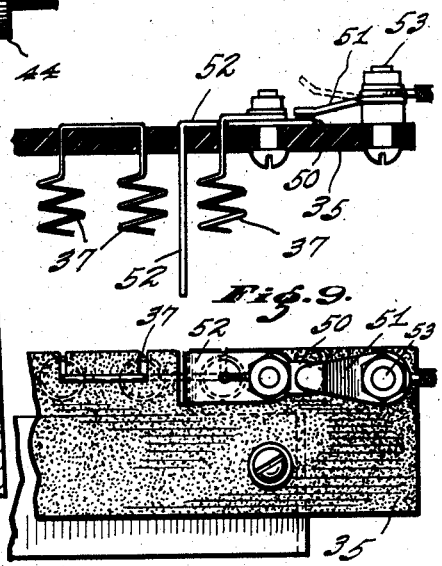
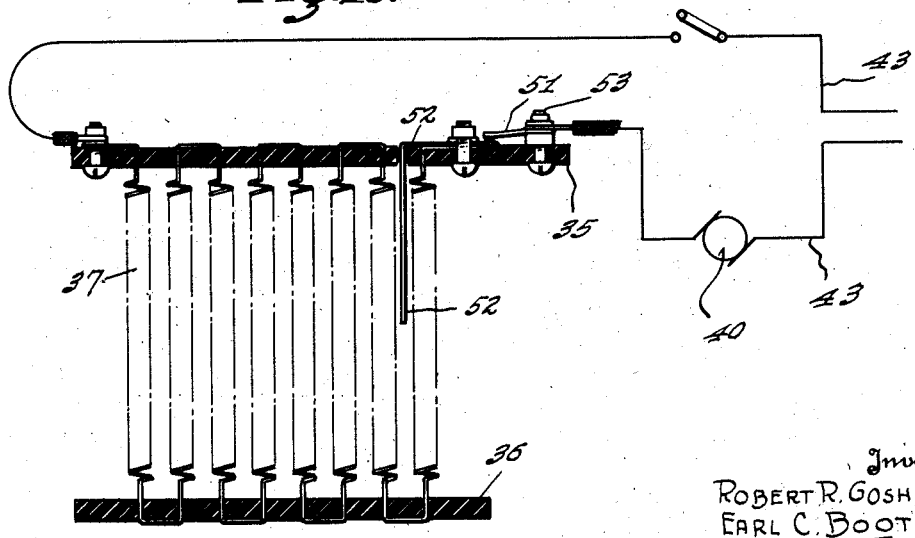
Inventor
ROBERT R. GOSHORN
EARL C. BOOTH,
By
Attorneys Patented Apr. 23, 1935

UNITED STATES PATENT OFFICE 1,998,670

ELECTRIC HEATER

Robert R. Goshorn and Earl C. Booth, Indianapolis, Ind., assignors to Noblitt-Sparks Industries, Inc., Indianapolis, Ind., a corporation of Indiana Application December 4, 1930, Serial No. 499,885

4 Claims. (Cl. 219—39)

It is the object of our invention to produce an electric space-heater of the type embodying a resistance heating element, and to make such a heater which will be more efficient than the simple radiant heater in general use. More specifically it is our object to produce a heater which will distribute the heat from the resistance heating element both by radiation and convection rather than by radiation alone. A further object of our invention is to produce a heater of this type which will not constitute a fire hazard. A still further object of our invention is to produce a heater that may be simply and economically constructed and that will prove durable and efficient in use.

In carrying out our invention we produce a casing for the heater, this casing having in one wall an opening in line with which the resistance heating element is located. Within the casing we dispose a fan which is arranged to be operated by an electric motor to force a current of air past the heating element and outwardly through the opening in the casing. In order to avoid the creation of a fire hazard we so construct the heater that a free flow of air over the heating element will not be prevented should the casing-opening be covered or obstructed in any way, and in addition we prefer to provide a thermostatically controlled switch which will interrupt the supply of current to the heating element should it reach an excessive temperature.

The accompanying drawings illustrate our invention: Figs. 1 and 2 are vertical sections through the heater in different planes; Fig. 3 is an isometric view of a sleeve which serves as a conduit through which air is conducted to the casing-opening; Fig. 4 is a front elevation of the sleeve illustrated in Fig. 3 showing the resistance heating element and a fan in place; Figs. 5 and 6 are vertical and horizontal sections respectively on the lines 5—5 and 6—6 of Fig. 4; Fig. 7 is a view similar to Fig. 2 but illustrating a slightly modified construction; Figs. 8 and 9 are fragmental views illustrating details of the thermostatic switch; and Fig. 10 is a diagrammatic view illustrating the preferred arrangement of electrical connections.

The casing for our heater comprises front and rear walls 15 and 16, side walls 17, and a cover 18. The casing is open at the bottom end, and the side and front walls are notched at their bottom edges to permit free access of air to the casing. The cover 18 preferably is provided with downturned flanges which receive the upper edges of the front, rear, and side walls of the casing and are secured thereto as by spot-welding. At its upper end, the rear wall 16 of the casing may have a centrally located depression 19 so that the adjacent portion of the edge of the cover 18 may be used as a handle to carry the heater.

In the front wall 15 of the casing, we provide an air discharge opening, preferably covered by a screen 21, and within the casing and in line with such opening we mount the sleeve 22 illustrated in Fig. 3. This sleeve is conveniently formed of two sheet-metal stampings shaped so that the rear end of the sleeve is circular in cross-section while the front end is rectangular. The top and bottom of the sleeve at a point between the circular and rectangular portions thereof are provided respectively with openings 23 and 24 for a purpose which will become evident hereinafter.

The rear end of the sleeve 22 is conveniently supported within the casing by means of a cross-member 26 which is provided with forwardly directed ears 27 adapted to be secured to the sides of the sleeve 22 as by means of screws 28. (See Fig. 6.) The ends of the cross-member 26 may be supported on brackets 30 mounted on the inner faces of the side walls 17 of the casing. Preferably, cushioning pads 31 are provided between the brackets 30 and the ends of the cross-member 26 in order to prevent noise.

The front end of the sleeve 22 may be supported from the front wall 15 of the casing as by means of brackets 32 which may be either separate pieces as illustrated in Fig. 5 or which may be formed as projections on the sleeve itself. As is clear from Figs. 5 and 7, the front end of the sleeve 22 is spaced from the front wall 15 of the casing in order to provide between the sleeve and the wall 15 lateral openings through which air can escape from the sleeve should the opening in the wall 15 be obstructed.

On the top and bottom of the sleeve 22 and near the front end thereof we secure respectively strips 35 and 36 of insulating material, the rear edges of which overlie the sleeve-openings 23 and 24, as is clear from Fig. 5. The rear edge of each of the strips 35 and 36 is provided with a series of notches which adapt the strips to serve as supports for a multiple-coil resistance heating element 37 the coils of which extend vertically between the strips 35 and 36 and across the opening in the sleeve 22.

On the cross-member 26 we mount an electric motor 40 the armature shaft of which carries at its front end a fan 41 which is rotatable by the motor to cause air-flow through the sleeve 22 in the direction indicated by the arrows in Figs. 5 and 6. The motor 40 and the heating element 37 are supplied with current through supply wires 43 which enter the casing through a bushing 44 of insulating material conveniently located in the rear wall 16.

The heating element 37 and the motor 40 may be connected in parallel, but are preferably connected in series as shown in Fig. 10 in order that the heating element will cease to function should the supply of current to the motor 40 be interrupted.

If desired, we may incorporate in the heater a thermostatic switch which may take the form illustrated in Figs. 8 and 9. The switch there shown, comprises a fixed contact 50, which is connected to one end of the heating element 37, and a movable element 51 connected to one of the supply wires 43. The fixed contact 50 is desirably provided by one end of a metallic strip 52 which extends to a point closely adjacent the heating element 37, and preferably between two coils thereof as illustrated in Figs. 8 and 10. The movable contact 51 is formed of spring material, such as phosphor-bronze, and is mounted at one end of a binding post 53 to which one of the supply wires is connected. The free end of the switch 51 is deflected from its normal position and held in contact with the fixed contact 50 by means of solder or other alloy of low-melting point.

Should the temperature of the heating element 37 become too high, the heat conducted from the heating element to the contact 50 by the strip 52 will serve to melt the solder which is used to hold the movable contact 51 in engagement with the fixed contact 50. When this occurs, the movable contact 51, owing to its resiliency, will move away from the fixed contact 50, as to the dotted-line position illustrated in Fig. 8. This separation of the contact 51 from the fixed contact 50 interrupts the supply of current to both the heating element 37 and the motor 40 and renders the entire heater inoperative.

For the purpose of protecting the parts within the casing from damage, the casing may be provided interiorly with a transverse screen 55 of foraminous material supported on brackets 56 below the sleeve 22 as is clear from Figs. 1 and 2.

It will be noted that since the heating element 37 is in line with the opening in the front wall of the casing radiant heat from such heating element will be delivered through the opening. In addition, air blown over the heating element and warmed thereby will be discharged from the casing and will serve to heat the surrounding space. Because the resistance element 37 is cooled by air from the fan 41, it operates at a lower temperature than would obtain if it were not located in an air stream. As a result, the heating element will have a longer life for a given current consumption, or the current consumption can be increased for a given life.

Normally, since the sleeve 22 is located in direct alinement with the opening in the front wall of the casing, substantially all the air delivered from such sleeve will emerge from the casing through the opening. Should the opening be obstructed from any cause, the air which is blown past the heating element by the fan 41 will escape from the sleeve 22 through the opening between the front end of such sleeve and the front wall 15 of the casing. A continuous circulation of air within the casing is therefore provided, even if the opening in the front wall of the casing is covered; and this continuous circulation of air operates to prevent the heating element 47 from attaining an unduly high temperature.

We claim as our invention:

1. A space-heater, comprising a hollow casing having an air-discharge opening in one side wall, a transverse cross-member mounted within said casing, a horizontal air conduit disposed within said casing in line with said discharge opening and having its rear end open and supported from said cross-member, said cross-member being materially narrower than said conduit in order to permit free flow of air from the interior of the casing into the open rear end of the conduit, a fan rotatably supported from said cross-member in said conduit and operable to force air through said conduit and out said discharge opening, means for driving said fan, and a resistance heating element for heating air passing through said conduit.

2. A space-heater, comprising a hollow casing having an air-discharge opening, an air conduit mounted within said casing and positioned so that air may flow through it and out said discharge opening, said conduit being provided with oppositely located slots in its wall, a member of insulating material supported adjacent each of said slots, a resistance heating element supported by said members and extending transversely across said conduit, and means for forcing air through said conduit and out said discharge opening.

3. A space-heater, comprising a hollow casing having an air-discharge opening, a transverse cross-member mounted within said casing, an air conduit disposed within said casing in line with said discharge opening, said cross-member being formed of sheet-metal and provided with struck-up ears, the rear end of said conduit being secured to said ears, a resistance heating element for heating air passing through said conduit, and means for forcing air through said conduit and out said discharge opening.

4. A space-heater as set forth in claim 3 with the addition that said cross-member is twisted near each end, the casing being provided interiorly with horizontal brackets adapted to engage and support the twisted ends of said cross-member with its center portion lying in a substantially vertical plane.

ROBERT R. GOSHORN.
EARL C. BOOTH.